(12) United States Patent
Boekelman et al.

(10) Patent No.: US 12,459,649 B2
(45) Date of Patent: Nov. 4, 2025

(54) PILOT SEAT ASSEMBLY WITH INTEGRATED REST POSITION

(71) Applicant: The Boeing Company, Arlington, VA (US)

(72) Inventors: Brandon Ronald Earl Boekelman, Kirkland, WA (US); Christopher David Haus, Renton, WA (US)

(73) Assignee: The Boeing Company, Alexandria, VA (US)

( * ) Notice: Subject to any disclaimer, the term of this patent is extended or adjusted under 35 U.S.C. 154(b) by 0 days.

(21) Appl. No.: 18/474,213

(22) Filed: Sep. 25, 2023

(65) Prior Publication Data

US 2025/0100691 A1    Mar. 27, 2025

(51) Int. Cl.
*B64D 11/06* (2006.01)
*B64C 1/18* (2006.01)

(52) U.S. Cl.
CPC ........ *B64D 11/064* (2014.12); *B64D 11/0689* (2013.01); *B64D 11/0696* (2013.01); *B64C 1/18* (2013.01)

(58) Field of Classification Search
CPC .............. B64D 11/064; B64D 11/0689; B64D 11/0696
See application file for complete search history.

(56) References Cited

U.S. PATENT DOCUMENTS

| | | | |
|---|---|---|---|
| 11,577,629 B2 * | 2/2023 | Meyer | B60N 2/0273 |
| 2012/0256457 A1 | 10/2012 | Cailleteau | |
| 2017/0275003 A1 * | 9/2017 | Erhel | B64D 11/0696 |
| 2019/0233119 A1 * | 8/2019 | Oleson | B60N 2/143 |
| 2021/0221520 A1 | 7/2021 | Oleson | |

FOREIGN PATENT DOCUMENTS

FR    3130254 A1    6/2023

OTHER PUBLICATIONS

Extended European search report mailed Nov. 2, 2025 for corresponding Application No. 24191969.5 (7 pages).

* cited by examiner

*Primary Examiner* — Nicholas McFall
*Assistant Examiner* — Justin Michael Heston
(74) *Attorney, Agent, or Firm* — Joseph M. Butscher; The Small Patent Law Group LLC

(57) ABSTRACT

A pilot seat assembly includes a track, a support base, a seat pan, and a seat. The track is mounted on a floor of a vehicle and defines a travel path from a forward end of the track to an aft end of the track. The support base is coupled to the track and is selectively moveable along the travel path. The seat pan is mounted to the support base and is selectively movable in an outboard direction and an inboard direction relative to the support base. The seat is mounted on the seat pan such that the seat pan is between the seat and the support base. A seat back section of the seat is selectively reclinable relative to a seat bottom section of the seat to transition the pilot seat assembly between a control position and a rest position.

20 Claims, 6 Drawing Sheets

PILOT SEAT ASSEMBLY WITH INTEGRATED REST POSITION

FIELD OF THE DISCLOSURE

Embodiments of the present disclosure generally relate to pilot seats on vehicles, such as aircraft, and more specifically to pilot seats designed to enable the occupant to transition between an upright, control position and a reclined, rest position.

BACKGROUND

Commercial aircraft flight deck accommodations typically provide primary seating for two pilots. Some aircraft have an area outside of the flight deck that is designated as a crew rest area. On long flights, multiple flight crew members (pilot and co-pilot) may be assigned to ensure pilot rest requirements are met. One crew member may fly the aircraft while another is resting in an alternate location. Allowing the crew members to rest during flights may be beneficial for several reasons, such as providing improved comfort and productivity of the pilots, which can result in better service for the passengers and improved compliance with regulations. However, allocating space outside of the flight deck specifically for crew rest may be undesirable from a revenue-generating perspective. For example, a commercial airline may not be able to accommodate as many passengers and/or as much cargo with the dedicated rest area present than on a flight that omits the dedicated crew rest area. Furthermore, some vehicles such as narrow-body aircraft may simply not have sufficient space to provide a dedicated crew rest area.

SUMMARY OF THE DISCLOSURE

A need exists for a pilot seat assembly that has integrated rest capabilities to enable the pilot to rest while in the seat within the flight deck, cab, or other area in which the pilot controls movement of an aircraft or other vehicle.

Certain embodiments of the present disclosure provide a pilot seat assembly that includes a track, a support base, a seat pan, and a seat. The track is mounted on a floor of a vehicle and defines a travel path from a forward end of the track to an aft end of the track. The support base is coupled to the track and selectively moveable along the travel path. The seat pan is mounted to the support base and is selectively movable in an outboard direction and an inboard direction relative to the support base. The outboard direction and the inboard direction are transverse to the travel path defined by the track. The seat is mounted on the seat pan such that the seat pan is between the seat and the support base. The seat includes a seat bottom section and a seat back section. The seat back section is selectively reclinable relative to the seat bottom section to transition the pilot seat assembly between a control position and a rest position.

Certain embodiments of the present disclosure provide an aircraft that includes a pilot seat assembly within a flight deck of the aircraft. The pilot seat assembly includes a track, a support base, a seat pan, and a seat. The track is mounted on a floor of a flight deck and defines a linear travel path from a forward end of the track to an aft end of the track. The linear travel path is oriented parallel to a longitudinal axis of a fuselage of the aircraft. The support base is coupled to the track and selectively moveable along the linear travel path. The seat pan is mounted to the support base and is selectively movable in an outboard direction and an inboard direction relative to the support base. The outboard direction and the inboard direction are transverse to the linear travel path defined by the track. The seat is mounted on the seat pan such that the seat pan is between the seat and the support base. The seat includes a seat bottom section and a seat back section. The pilot seat assembly is configured to transition from a control position, at which a pilot controls the aircraft, to a rest position by the seat back section reclining relative to the seat bottom section and the support base moving toward the aft end of the track.

Certain embodiments of the present disclosure provide a method of assembling a pilot seat assembly. The method includes mounting a track on a floor of a vehicle. The track defines a travel path from a forward end of the track to an aft end of the track. The method includes coupling a support base to the track such that the support base is selectively moveable along the travel path. The method includes mounting a seat pan to the support base such that the seat pan is selectively movable in an outboard direction and an inboard direction relative to the support base. The outboard direction and the inboard direction are transverse to the travel path defined by the track. The method includes mounting a seat on the seat pan such that the seat pan is between the seat and the support base. The seat includes a seat bottom section and a seat back section. The seat back section is selectively reclinable relative to the seat bottom section to transition the pilot seat assembly between a control position and a rest position.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
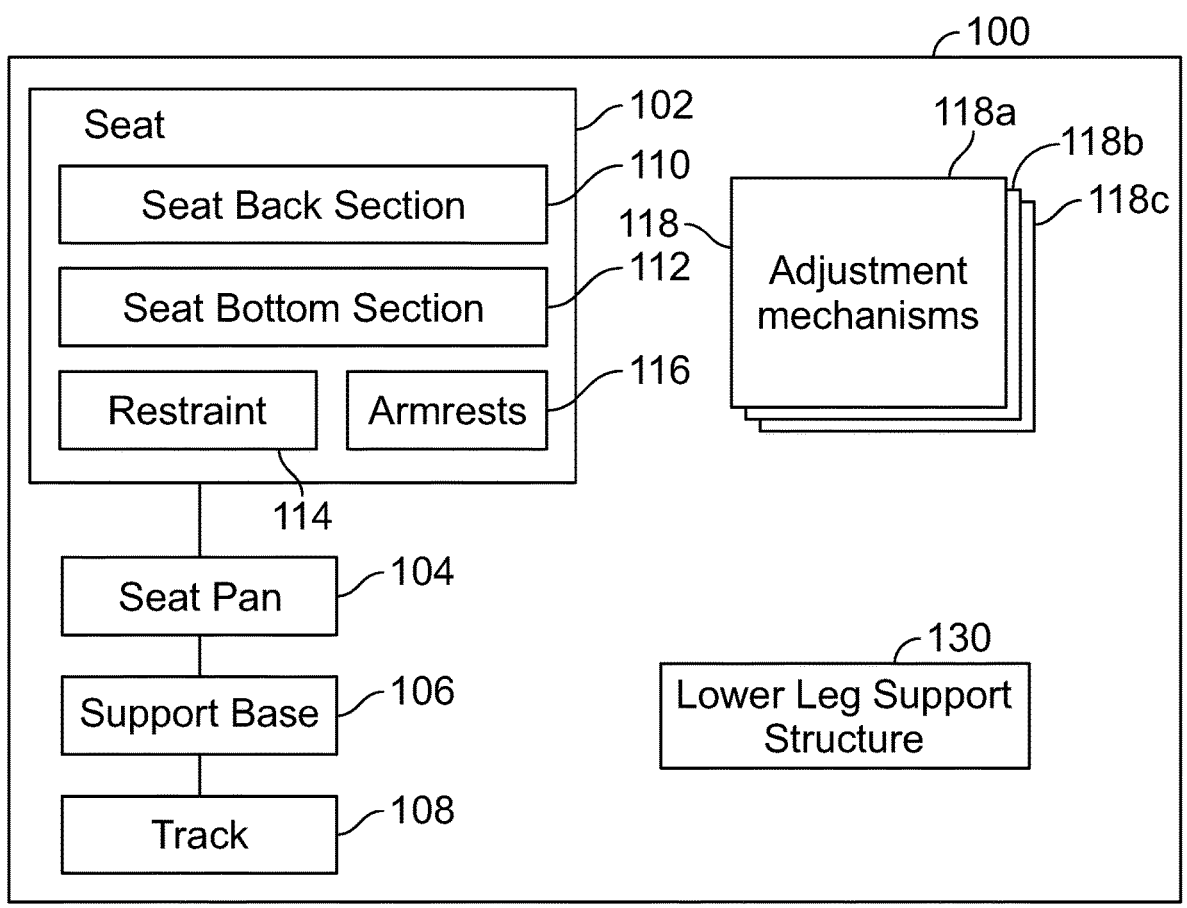
FIG. 1 is a block diagram of a pilot seat assembly according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a pilot seat assembly for a vehicle. The pilot seat assembly is used (e.g., occupied) by a pilot. The pilot is certified to control movement of the vehicle. The pilot seat assembly is located in a control area of the vehicle. The control area of an aircraft is a flight deck (e.g., cockpit). The control area of a truck is a cab. The pilot may sit on the pilot seat assembly to control movement of the vehicle. In embodiments described herein, the pilot seat assembly serves a dual function. For example, the pilot seat assembly provides the traditional role of supporting and restraining the pilot when the pilot is monitoring and controlling the movement of the vehicle. The pilot seat assembly integrates rest features to also function as a crew rest facility for the pilot. For example, the pilot seat assembly reclines and translates from a control position to a rest position. By combining the crew rest aspect into the pilot seat assembly, pilot rest is incorporated into the space that is currently allocated for the pilot seat assembly. For example, the pilot can rest without leaving the flight deck, cab, or other control area of the vehicle controlled by the pilot. Also, the vehicle does not need to designate an area outside of the control area for pilot rest, so the vehicle can use that space for revenue-generating purposes (e.g., increasing the number of passengers and/or cargo). Providing crew rest in the flight deck area as described herein may also reduce the number of flight crew members used for longer flights. Also, having a pilot in a rest position in the flight deck could offer safety and security benefits during potential future automated pilot operations, as the human pilot is disposed in the secured flight deck.

The pilot seat assembly may be selectively movable between a control state, a rest state, and an ingress/egress state. The control state of the pilot seat assembly refers to the typical position of a seat occupied by a pilot that is actively monitoring movement of the vehicle and controlling the movement of the vehicle. For example, the seat back may be upright, and the seat is positioned such that the pilot sitting in the seat can view the windshield and display devices and can easily reach and manipulate control input devices (e.g., yoke, steering wheel, side stick, thrust levers, rudder pedals, throttles, etc.). The control state of the pilot seat assembly may be adjusted such that the pilot, when seated in the pilot seat assembly, achieves an eye reference position or design eye point to easily interact with the various vehicle systems. The rest state of the pilot seat assembly refers to the seat back being reclined and the seat recessed in the aft direction relative to the pilot seat assembly in the control state. For example, the seat back section may be reclined at least 40 degrees relative to an upward vertical direction, which enables the pilot to achieve a supine or generally supine lying position that is more favorable for rest than the upright sitting position of the pilot in the control state. The seat is moved in the aft direction in the rest state to allow the pilot to stretch out and extend his or her legs (e.g., at least to a greater extent than when the pilot seat assembly is in the control state). The pilot seat assembly may include a lower leg support structure on which the pilot's legs can rest when in the rest state. The ingress/egress state refers to the seat being oriented upright, like the control state, but laterally offset from the control state. The positioning of the pilot seat assembly in the ingress/egress state provides space for the pilot to get up and exit the seat, as well as space for the pilot to approach and sit down in the seat. For example, a pilot of an aircraft may move the pilot seat assembly laterally in an outboard direction to an ingress/egress position to enable the pilot to walk between the pilot seat assembly and a center aisle stand or console of the flight deck. The pilot may selectively and repeatedly transition the seat between the control, rest, and ingress/egress states by actuating one or more adjustment mechanisms.

Known pilot seats are not capable of selectively moving between a control state, a rest state, and an ingress/egress state. Such known pilot seats have limited range of movement in the fore and aft directions and the recline direction. For example, some pilot seats are mounted in a fixed (e.g., static, immovable) position on the floor and any movement in the fore and aft direction are substantially limited to seat pan adjustments. Other pilot seats are mounted to the floor using short, J-shaped tracks. The short, J-shaped tracks do not enable the pilot seat to move a sufficient distance in the fore and aft directions to transition between the control state and the rest state.

In one or more embodiments, the vehicle in which the pilot seat assembly is installed is an aircraft. For example, the pilot seat assembly is installed in the flight deck. In an embodiment, the pilot seat assembly is designed to qualify as a Class III crew rest facility when in the rest state (e.g., rest position). The Class III crew rest facility is defined by United States Federal Aviation Administration (FAA) guidelines. For example, a Class III rest facility is defined as a seat in an aircraft cabin or flight deck that reclines at least 40 degrees and provides leg and foot support. Although several embodiments show and describe the pilot seat assembly installed within an aircraft, the pilot seat assembly is not limited to aircraft applications and may be installed in other types of vehicles. For example, the pilot seat assembly may be used in trucks, mining vehicles, marine vessels, rail vehicles, and/or the like.

Figure 2:
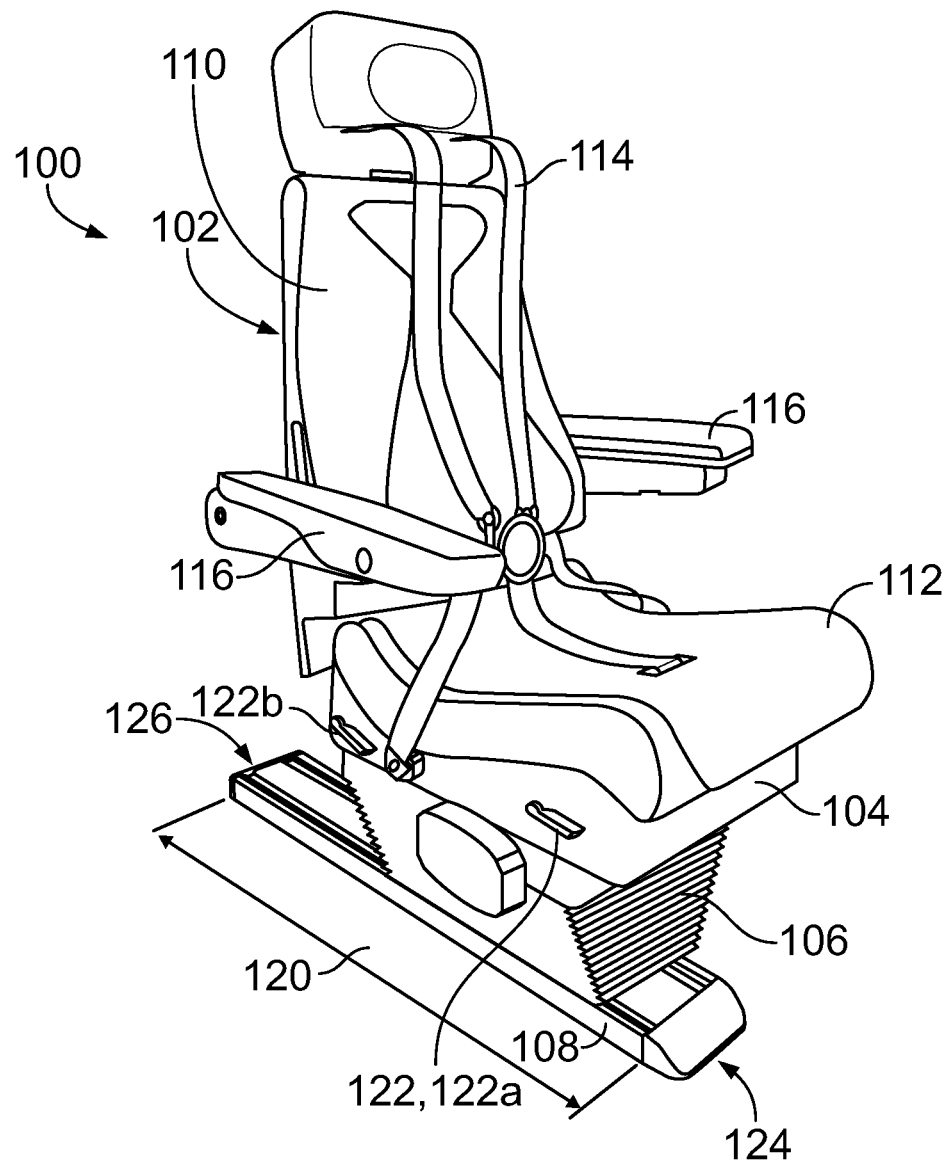
FIG. 2 illustrates the pilot seat assembly according to an embodiment.

Referring now to the drawings, FIG. 1 is a block diagram of a pilot seat assembly 100 according to an embodiment. FIG. 2 illustrates the pilot seat assembly 100 according to an embodiment. The following description refers to both FIGS. 1 and 2 unless specified. The pilot seat assembly 100 includes a seat 102, a seat pan 104, a support base 106, and a track 108. The seat 102 includes a seat back section 110 and a seat bottom section 112. The seat 102 may also include a restraint 114 and armrests 116. The user sits on the seat bottom section 112. The user is typically a pilot of a vehicle and is referred to herein as a pilot. The seat back section 110 extends from the seat bottom section 112 and supports the pilot's back. The restraint 114 selectively secures the pilot in the seat 102. The restraint 114 may be a seatbelt, harness, and/or the like. The armrests 116 are platforms on which the pilot in the seat 102 can rest his or her arms. The armrests 116 may be secured to the seat back section 110 or the seat bottom section 112.

The seat 102 is mounted on the seat pan 104. The seat pan 104 is mounted on the support base 106. The seat pan 104 may be disposed between the seat 102 and the support base 106. The support base 106 is mounted to the track 108. The track 108 is installed along a floor of the vehicle and is fixed in place relative to the vehicle. The track 108 defines a travel path 120 along which the support base 106 can selectively and repeatedly translate. When the support base 106 is moved along the travel path of the track 108, the seat pan 104 and the seat 102 move with the support base 106. As such, movement of the support base 106 relative to the track 108 causes the seat 102 and the pilot thereon to translate relative to the vehicle. Translational movement described herein refers to movement along at least one plane, rather than simply rotating along an axis. The seat pan 104 may be an intermediary support structure that allows the seat 102 to move relative to the support base 106 and the track 108. The seat pan 104 may enable the seat 102 to laterally translate relative to the support base 106. For example, a pilot may use the seat pan 104 to move the seat 102 in an outboard direction to allow the pilot an ingress and/or egress pathway for the seat 102. Optionally, the seat pan 104 or the support base 106 may enable the seat 102 to vertically move for adjusting to the pilot's height.

The pilot seat assembly 100 may include one or more adjustment mechanisms 118 that are actuatable by the pilot to selectively adjust the positioning of the seat 102 relative to the track 108 and the vehicle. For example, a first adjustment mechanism 118a may be incorporated into the support base 106 and may be actuated to provide movement of the support base 106 (and seat pan 104 and seat 102) along the travel path 120 of the track 108. A second adjustment mechanism 118b may be incorporated into the seat pan 104 and may be actuated to provide lateral movement of the seat pan 104 (and seat 102) in the outboard and inboard directions for ingress and egress of the pilot. A third adjustment mechanism 118c may be incorporated into the seat 102 and may be actuated to change a recline angle of the seat back section 110 relative to the seat bottom section 112. For example, to transition the pilot seat assembly 100 from a control state or position to a rest state or position, the pilot may actuate the first adjustment mechanism 118a to translate the support base 106 in the aft direction relative to the vehicle and may actuate the third adjustment mechanism 118c to recline the seat back section 110. Optionally, the pilot seat assembly 100 may include at least a fourth adjustment mechanism for changing a height of the seat 102 relative to the track 108 and/or changing a tilt angle of the seat bottom section 112. The fourth adjustment mechanism may be incorporated into the seat pan 104 or alternatively into the support base 106.

In an embodiment, at least some of the adjustment mechanisms 118 are powered by mechanical actuators. For example, a pilot may actuate an input device 122 of the adjustment mechanism 118. The input device 122 may control an actuator to automatically propel movement of the corresponding portion of the pilot seat assembly 100 in a controlled direction and speed. The input device 122 may be a lever, button, switch, or the like that is installed along a side of the pilot seat assembly 100 within reach of the pilot sitting on the seat 102. Different adjustment mechanisms 118 may include different, discrete input devices 122 mounted along the side of the pilot seat assembly 100. At least some of the input devices 122 may be mounted along the side of the seat bottom section 112, the side of the seat pan 104, and/or the side of the support base 106. Alternatively, or in addition, an input device for adjusting the positions may be on an instrument panel, a control panel, or a display panel of the vehicle within reach of the pilot sitting on the seat 102. The actuator may be electrically powered.

Optionally, one or more of the adjustment mechanisms 118 may include a control device including hardware circuitry, such as one or more processors. The control device may receive a user input signal in response to the pilot manually pressing or otherwise actuating the input device 122. In response to receiving the user input signal, the control device may generate a control signal that controls the actuator to move the corresponding portion of the pilot seat assembly 100 (e.g., the seat 102, the seat pan 104, or the support base 106) in a designated direction at a designated speed. Optionally, the control device may control the actuator to move the seat 102, seat pan 104, or support base 106 for a designated distance to achieve a preset state or position of the component. The seat 102 of the pilot seat assembly 100 may be in the upright, control position in FIG. 2. In an example, a pilot sitting in the seat 102 in the upright, control position may actuate a first input device 122a which causes the pilot seat assembly 100 to automatically transition to the rest position. For example, the first input device 122a may trigger the controller device to control a first actuator in the support base 106 to move the support base 106 in the aft direction relative to the track 108 and to control a second actuator in the seat 102 to recline the seat back section 110 relative to the seat bottom section 112. These dual movements may be concurrently performed. Alternatively, the movements may be performed in sequence. In another example, the pilot may transition the pilot seat assembly 100 to the rest position from the control position by actuating the first input device 122a of a first adjustment mechanism 118a and actuating a second input device 122b of a second adjustment mechanism 118b. For example, the first input device 122a may trigger a first actuator to move the support base 106 aft along the track 108, and the second input device 122b may trigger a second actuator to automatically recline the seat back section 110 of the seat 102 to achieve the rest position.

In an embodiment, at least some of the adjustment mechanisms 118 include biasing elements instead of powered actuators. The biasing elements may include springs, tension, compressed air, hydraulic fluid, or the like to exert a biasing force on a corresponding portion of the pilot seat assembly 100. For example, the support base 106 may include a first adjustment mechanism 118a that includes one or more biasing elements that exert a biasing force on the support base 106 toward a fore (e.g., front) end 124 of the track 108. As such, the support base 106 may be biased toward the control position or state. The pilot may actuate the first input device 122a to release a locking mechanism that secures the support base 106 in a fixed position on the track 108. Releasing the locking mechanism may allow the support base 106 to slide along the travel path 120 toward an aft end 126 of the track 108. Once the locking mechanism is released, the pilot may use his or her legs to push the support base 106 in the aft direction toward the aft end 126 to achieve the rest position. To transition from the rest position back to the control position, the pilot may actuate the first input device 122a again to release the locking mechanism. The biasing element(s) may force the support base 106 to slide toward the forward end 124 of the track 108. Optionally, the locking mechanism securing the support base 106 to the track 108 is a first locking mechanism, and actuating the first input device 122a may also release a second locking mechanism. The second locking mechanism may secure the seat back section 110 in a fixed position relative to the seat bottom section 112. Releasing the second locking mechanism may allow the seat back section 110 to recline relative to the seat bottom section 112. Once the second locking mechanism is released, the pilot may use his or her torso and/or arms to recline the seat back section 110 to achieve the rest position. In this embodiment, actuating a single lever or other input device 122a can allow the pilot to both slide the support base 106 along the track 108 and recline the seat back section 110 to transition from the control position to the rest position.

In an example, the seat pan 104 may include another adjustment mechanism 118b that includes one or more biasing elements that exert a lateral biasing force on the seat pan 104 in an inboard direction. The inboard direction is toward a central longitudinal axis or plane in the vehicle. The central longitudinal axis or plane represents a mid-point between a first side and a second side of the vehicle. The seat pan 104 may be biased toward an inboard position. The seat pan 104 may be in the inboard position when in the control position or state shown in FIG. 2. To transition to the ingress/egress position or state, the pilot may actuate the second input device 122b which releases a locking mechanism that secures the seat pan 104 in a fixed position relative to the support base 106. Releasing the locking mechanism allows the pilot to move the seat pan 104 in an outboard direction relative to the support base 106 and the track 108, against the lateral biasing force. The seat 102 moves outboard with the seat pan 104. Moving the seat pan 104 and seat 102 to an outboard position allows the pilot additional space to move, such as for approaching the seat 102 and for exiting the seat 102.

The pilot seat assembly 100 may include a lower leg support structure 130. The lower leg support structure 130 supports the pilot's legs while the pilot seat assembly 100 is in the rest position. The lower leg support structure 130 in an embodiment may be spaced apart from the seat 102, the seat pan 104, the support base 106, and the track 108. For example, the lower leg support structure 130 may be installed in a space of the vehicle underneath the control panel, instrument panel, display panel, or the like. In another embodiment, the lower leg support structure 130 may be mounted to the track 108 and/or the support base 106. For example, the lower leg support structure 130 may be selectively movable between a stowed position and a deployed position. In the stowed position, the lower leg support structure 130 may be folded down and/or recessed such that the pilot is not able to rest his or her legs on the lower leg support structure 130. The lower leg support structure 130 may be in the stowed position while in the control state or position, as the pilot places his or her feet on the floor of the vehicle or on one or more pedals for controlling movement of the vehicle. In the deployed position, the lower leg support structure 130 is extended outward and/or lifted to support the pilot's legs while the pilot seat assembly 100 is in the rest state or position. Optionally, one of the adjustment mechanisms 118 may control movement of the lower leg support structure 130 between the stowed and deployed positions using an actuator, a biasing element, and/or the like. For example, a biasing element may exert a biasing force on the lower leg support structure 130 in the deployed position, such that releasing a locking mechanism may cause the lower leg support structure 130 to automatically extend from the stowed position to the deployed position to achieve the rest position.

Figure 3:
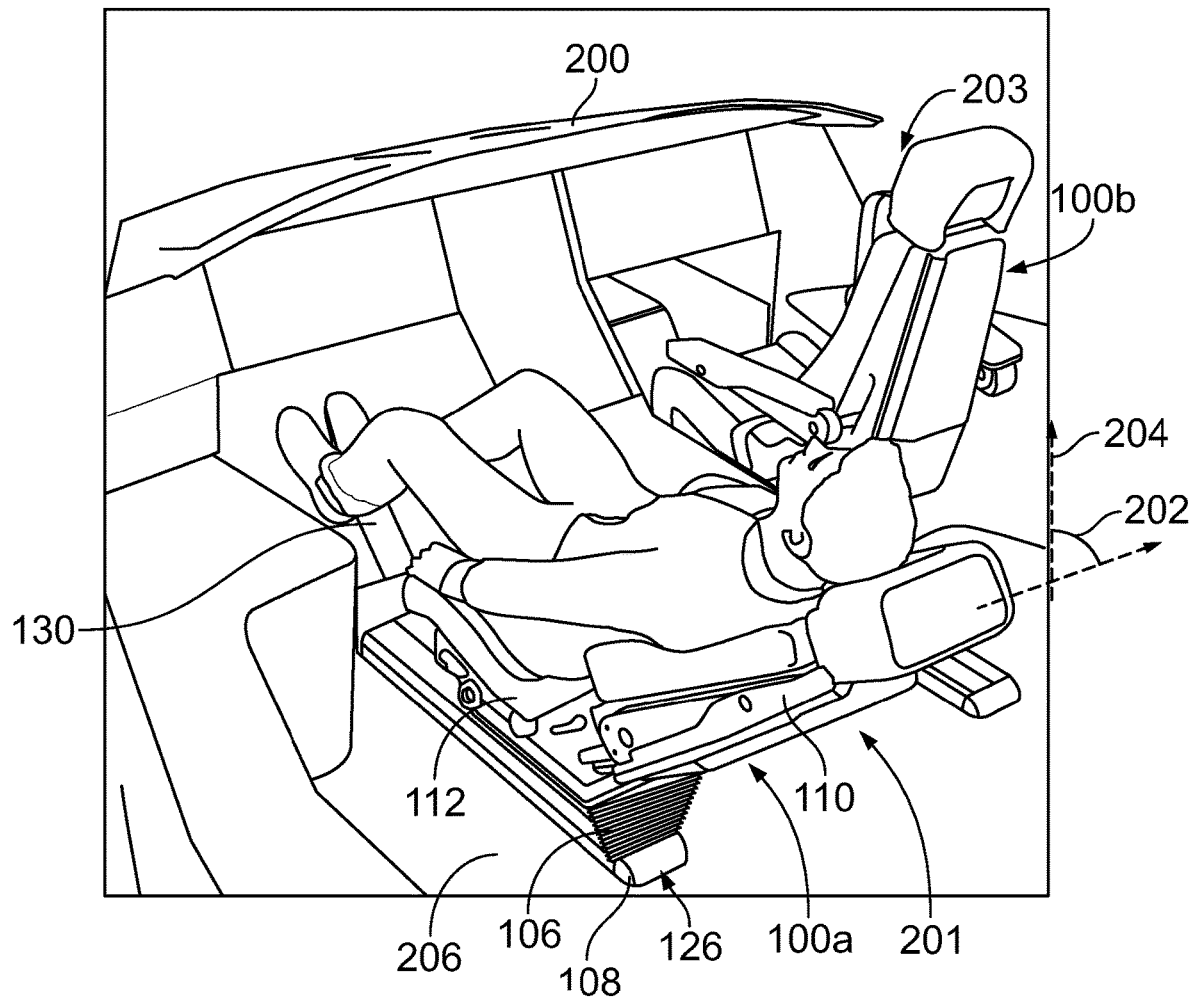
FIG. 3 illustrates a first pilot seat assembly and a second pilot seat assembly within a vehicle according to an embodiment.

FIG. 3 illustrates a first pilot seat assembly 100a and a second pilot seat assembly 100b within a vehicle 200 according to an embodiment. The first and second pilot seat assemblies 100a, 100b may each represent the pilot seat assembly 100 shown in FIGS. 1 and 2. The first pilot seat assembly 100a is shown in the rest state or position 201. The second pilot seat assembly 100b is shown in the control state or position 203. A pilot is present on the first pilot seat assembly 100a. The pilot is lying in a supine position. The pilot's feet are lifted above a floor 206 of the vehicle 200 and supported by the lower leg support structure 130. The support base 106 is retracted to the aft end 126 of the track 108, which provides sufficient space for the pilot to stretch out his or her legs. The track 108 is mounted on the floor 206. The seat back section 110 is reclined relative to the seat bottom section 112. In an embodiment, the seat back section 110 is reclined to an angle 202 that is at least 40 degrees relative to an upward vertical direction 204. Optionally, the seat back section 110 may recline to various set positions within a range for occupant comfort. The range may extend to 90 degrees relative to the upward vertical direction 204, such that the seat 102 essentially forms a horizontal resting surface. The pilot seat assembly 100a in the rest position may qualify as a Class III crew rest facility according to Federal Aviation Administration (FAA) guidelines. For example, the pilot seat assembly 100a reclines at least 40 degrees from the upward vertical direction 204 and provides leg and foot support. The pilot in the first pilot seat assembly 100a can transition the pilot seat assembly 100a from the upright, control position to the rest position to allow the pilot to rest while a pilot in the second pilot seat assembly 100b monitors and/or controls the movement of the vehicle, and vice versa.

Figure 4:
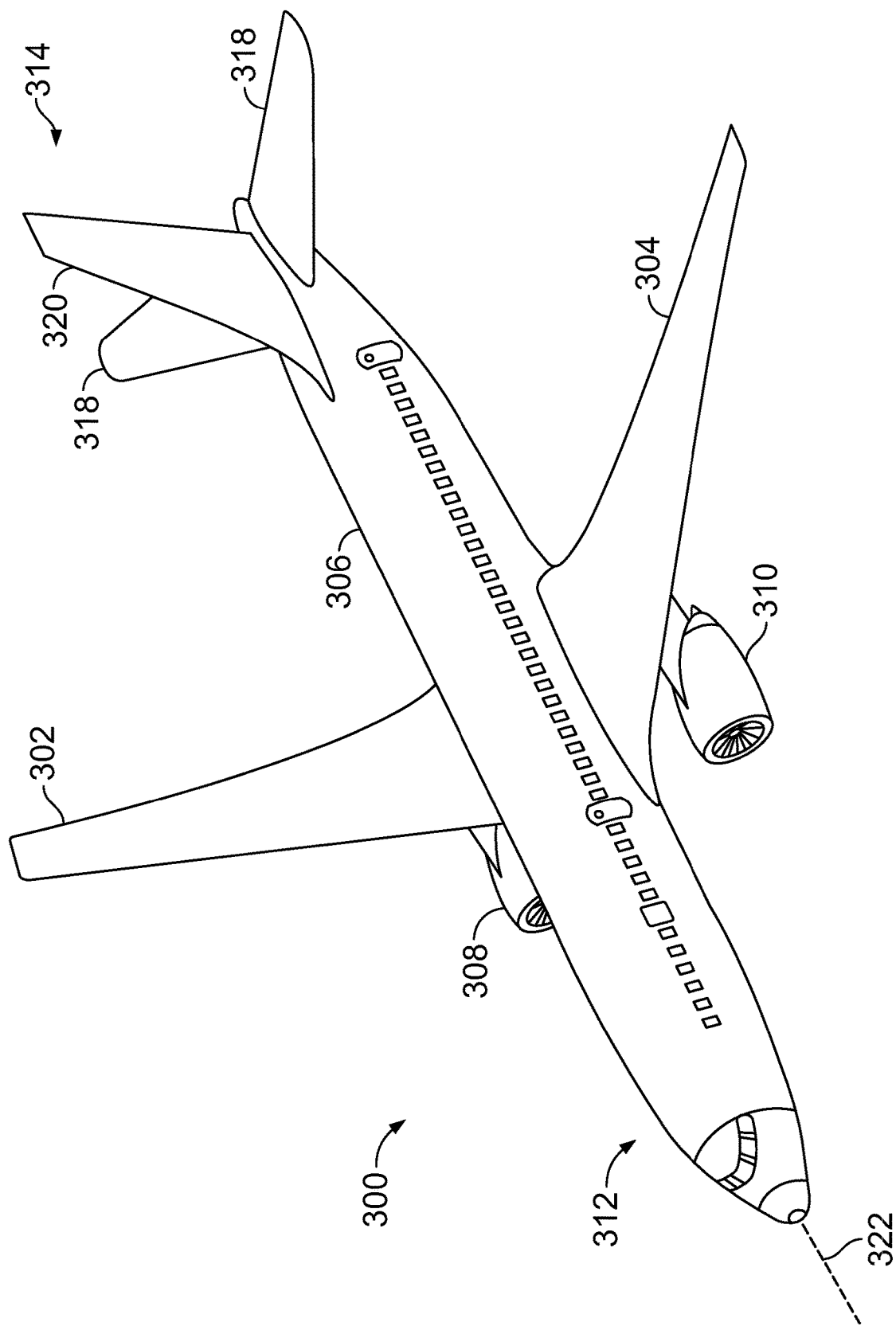
FIG. 4 is a perspective illustration of an aircraft.

FIG. 4 is a perspective illustration of an aircraft 300. The aircraft 300 may be the vehicle 200 shown in FIG. 3. The aircraft 300 includes a fuselage 306 extending from a nose section 312 to an empennage 314 or tail section. The aircraft 300 includes a pair of wings 302, 304 extending from the fuselage 306. The wings 302, 304 may include movable wing surfaces, such as ailerons, flaps, and/or spoilers. One or more propulsion systems 308, 310 propel the aircraft 300. The propulsion systems 308, 310 are supported by the wings 302, 304 of the aircraft 300 in the illustrated embodiment, but may be mounted to the fuselage 306 or empennage 314 in other types of aircraft. The empennage 314 may include horizontal stabilizers 316, 318 and a vertical stabilizer 320. The fuselage 306 defines multiple sections or cabins along the length of the fuselage 306 from the nose section 312 to the empennage 314. The fuselage 306 is oriented about a longitudinal axis 322. In an embodiment, the pilot seat assembly 100 is disposed within the aircraft 300. For example, the pilot seat assembly 100 may be within flight deck or cockpit of the aircraft 300 at or near the nose section 312. The pilot seat assembly 100 may be occupied by a pilot of the aircraft 300 that controls the flight of the aircraft 300. The pilot may be a captain or a first officer. The aircraft 300 may have two pilot seat assemblies 100 within the flight deck, as shown in FIGS. 3, 5, and 6.

Although the pilot seat assembly 100 is described as being installed onboard an aircraft 300 in FIG. 4, the pilot seat assembly 100 may be implemented on various other types of vehicles. The other types of vehicles may include rail-based trains, marine vessels, trucks, mining vehicles, buses, and/or the like.

Figure 5:
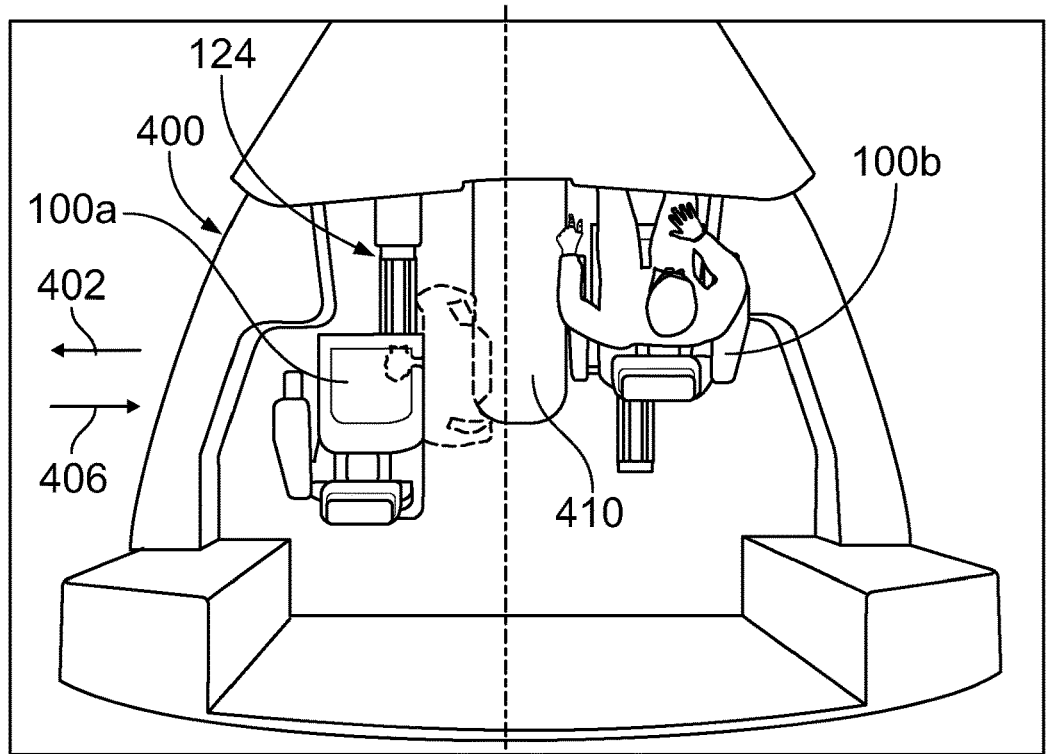
FIG. 5 illustrates a top-down view of a flight deck of an aircraft according to an embodiment.

FIG. 5 illustrates a top-down view of a flight deck 400 of an aircraft according to an embodiment. The flight deck 400 may be within the aircraft 300 shown in FIG. 4. The flight deck 400 includes the first pilot seat assembly 100a and the second pilot seat assembly 100b. FIG. 6 illustrates an end view of the flight deck 400 looking in a forward direction according to an embodiment. The first pilot seat assembly 100a is in the ingress/egress position in FIGS. 5 and 6. The second pilot seat assembly 100b is in the control position and is occupied by a pilot. In the control position and the rest position, the seat pan 104 and seat 102 may be laterally centered relative to the support base 106 and the track 108, as shown by the second pilot seat assembly 100b in FIG. 6. To allow a pilot to access the seat 102 and/or exit the seat 102, the pilot seat assemblies 100 can be transitioned to the ingress/egress position shown by the first pilot seat assembly 100a.

Figure 6:
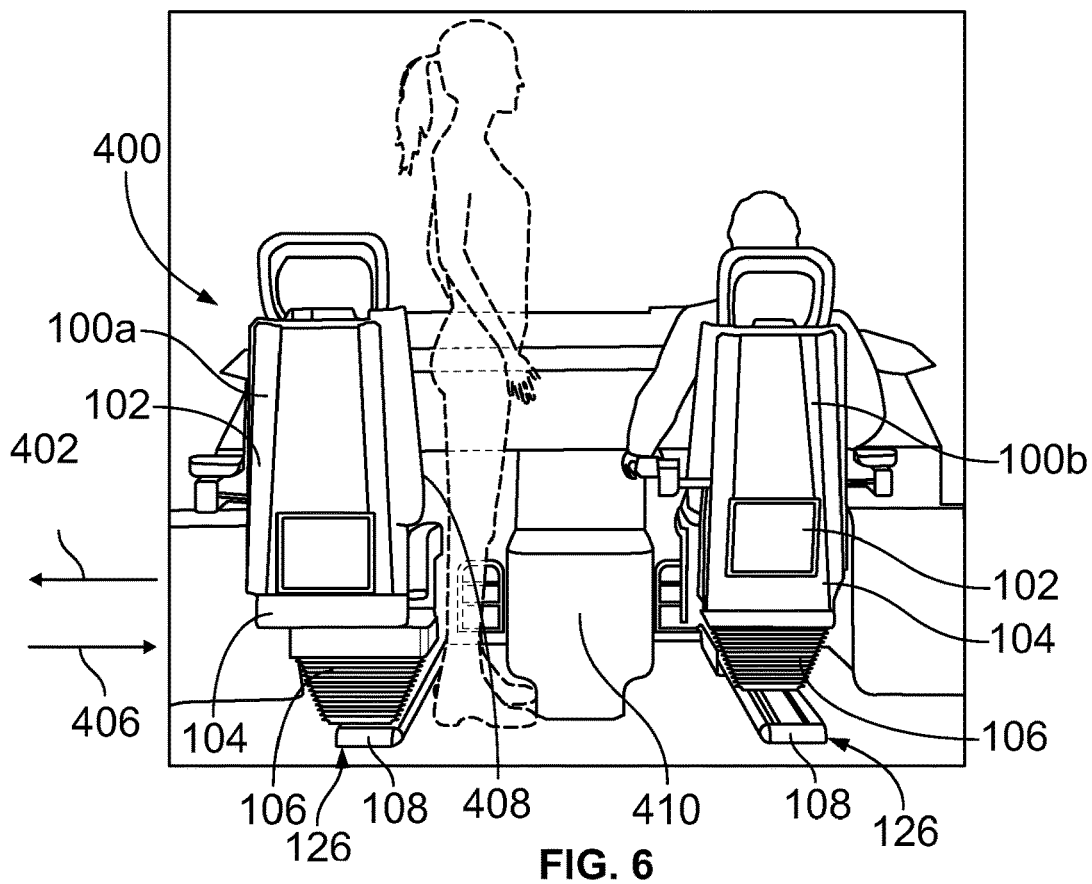
FIG. 6 illustrates an end view of the flight deck looking in a forward direction according to an embodiment.

As shown in FIGS. 5 and 6, the seat pan 104 and seat 102 of the first pilot seat assembly 100a in the ingress/egress position are laterally offset from the support base 106. The seat pan 104 and seat 102 are offset in an outboard direction 402, which extends away from a central longitudinal axis 404 that bisects the flight deck 400. In an embodiment, the support base 106 and the track 108 do not move laterally. For example, the support base 106 is restricted to movement along the travel path 120 (shown in FIG. 2) of the track 108. In an example, the travel path 120 of the track 108 is oriented parallel to the central longitudinal axis 404. As such, the support base 106 is limited to longitudinal movement. The seat pan 104 is able to move transverse to the travel path 120 defined by the track 108. For example, the seat pan 104 may move in the outboard direction 402 to achieve the ingress/egress position, and may move in an inboard direction 406, opposite the outboard direction 402, to attain the control position and/or the rest position. The outboard and inboard directions 402, 406 may be transverse to the travel path 120 defined by the track 108. With the seat pan 104 and seat 102 shifted outboard, a pilot has more space to move between an inboard side 408 of the seat 102 and a center console 410 or aisle stand that is between the two pilot seat assemblies 100a, 100b. Once seated in the seat 102, the pilot may actuate an adjustment mechanism 118 integrated with the seat pan 104 to move the seat pan 104 and the seat 102 in the inboard direction 406 until the seat pan 104 and seat 102 are laterally centered relative to the support base 106.

In an embodiment, the support base 106 of the pilot seat assembly 100 may be located farther aft while in the ingress/egress position than while in the control position. For example, as shown in FIGS. 5 and 6, the support base 106 of the first pilot seat assembly 100a may be located at or near the aft end 126 of the track 108. For comparison, the support base 106 of the second pilot seat assembly 100b in the control position is spaced a significant distance ahead of the aft end 126 of the respective track 108. In this embodiment, once the pilot sits down, the first pilot seat assembly 100a may transition from the ingress/egress position to the control position by the seat pan 104 moving inboard toward the center console 410 and the support base 106 moving in the forward direction toward the forward end 124 of the track 108. These movements may be reversed to transition from the control position to the ingress/egress position to allow the pilot to exit the seat 102 and exit the flight deck 400. In an embodiment, the seat pan 104 provides lateral movement of the seat 102 and the support base 106 and track 108 provide longitudinal movement of the seat 102 (and the seat pan 104).

Figure 7:
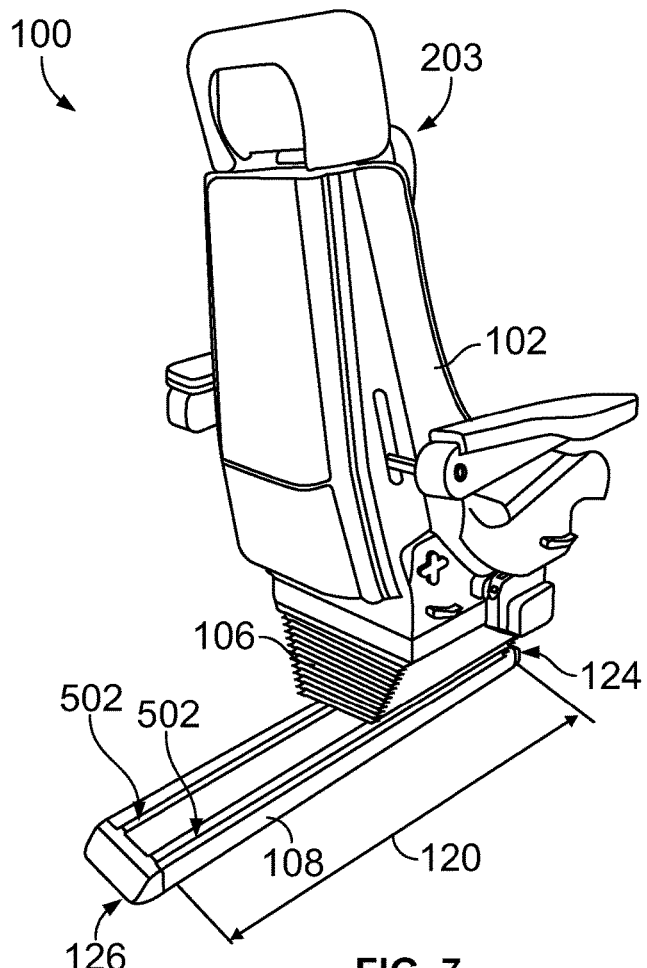
FIG. 7 is a perspective view of the pilot seat assembly in a control position according to an embodiment.

FIG. 7 is a perspective view of the pilot seat assembly 100 in the control position 203 according to an embodiment. In the control position 203, the support base 106 may be located at or proximate to the forward end 124 of the track 108. In an embodiment, the track 108 is a straight track, and the travel path 120 is a linear travel path. The linear travel path 120 may be oriented parallel to the longitudinal axis 322 of the aircraft 300 (shown in FIG. 4) and/or the central longitudinal axis 404 of the flight deck 400 (shown in FIG. 5). In an example, the track 108 includes two parallel channels 502. Each of the channels 502 may receive a corresponding bracket of the support base 106 therein. The brackets slide within the corresponding channels 502 along the linear travel path 120 between the forward end 124 and the aft end 126. The multiple brackets and channels 502 may provide increased structural support and stability relative to the track 108 including only a single channel that receives only a single bracket of the support base 106. The track 108 optionally may have three or more channels in another embodiment.

Mounting the support base 106 to the track 108 along the floor enables the pilot seat assembly 100 to have a significant travel distance. For example, the support base 106 may be able to move at least 15 inches or farther from the forward end 124 of the track 108 to the aft end 126. As such, the seat 102 may be movable at least 15 inches during the transition between the control position shown in FIG. 7 and the rest position shown in FIG. 3. Optionally, the travel distance of the support base 106 may be at least 17 inches, at least 20 inches, or the like. Some known pilot seats have a longitudinal adjustment in the seat pan, but the seat pan is not able to move the distances achievable by the support base 106 and the track 108 described herein. The benefit of the longer travel path is that the pilot is able to fully stretch out his or her legs when in the rest position. The longer travel path may also be beneficial for ingress and egress as moving the seat 102 a significant distance in the aft direction, as well as outboard, may provide more room for the pilot to navigate past the seat 102.

Figure 8:
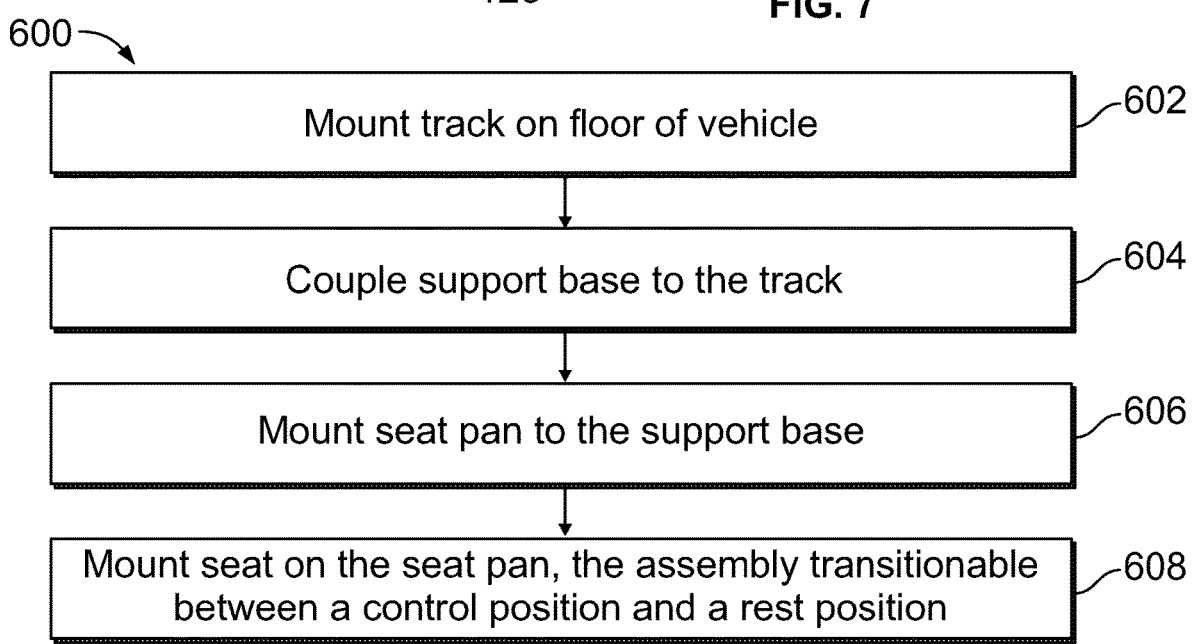
FIG. 8 is a flow chart of a method of assembling a pilot seat assembly according to an embodiment.

FIG. 8 is a flow chart 600 of a method of assembling a pilot seat assembly according to an embodiment. The pilot seat assembly that is assembled may be the pilot seat assembly 100 described herein. The method in one or more embodiments may include additional steps, fewer steps, and/or different steps than the steps shown in the flow chart 600, and/or one or more of the steps may be performed in a different sequence than illustrated and described herein.

At step 602, a track 108 is mounted on a floor 206 of a vehicle 200. The track 108 defines a travel path 120 from a forward end 124 of the track 108 to an aft end 126 of the track 108. In an example, the vehicle 200 is an aircraft 300. For example, the track 108 may be mounted on the floor 206 within a flight deck 400 of the aircraft 300. The seat 102 may be occupied by a pilot of the aircraft 300. At step 604, a support base 106 is coupled to the track 108 such that the support base 106 is selectively moveable along the travel path 120. The support base 106 is supported by the track 108.

At step 606, a seat pan 104 is mounted to the support base 106 such that the seat pan 104 is selectively movable in an outboard direction 402 and an inboard direction 406 relative to the support base 106. The outboard direction 402 and the inboard direction 406 are transverse to the travel path 120 defined by the track 108. The seat pan 104 is supported by the support base 106. The support base 106 is between the seat pan 104 and the track 108.

At step 608, a seat 102 is mounted on the seat pan 104 such that the seat pan 104 is between the seat 102 and the support base 106. The seat 102 includes a seat bottom section 112 and a seat back section 110. The seat bottom section 112 may be secured to the seat pan 104. The seat back section 110 is selectively reclinable relative to the seat bottom section 112 to transition the pilot seat assembly 100 between a control position 203 and a rest position 201.

Optionally, the travel path 120 defined by the track 108 may be a linear travel path. The support base 106 may be coupled to the track 108 such that the support base 106 is slidable along the linear travel path 120 at least 15 inches toward the aft end 126 of the track 108 to transition the pilot seat assembly 100 from the control position 203 to the rest position 201. The support base 106 may be restricted to movement along the linear travel path 120.

Further, the disclosure comprises examples according to the following clauses:

Clause 1. A pilot seat assembly comprising:
a track mounted on a floor of a vehicle and defining a travel path from a forward end of the track to an aft end of the track;

a support base coupled to the track and selectively moveable along the travel path;

a seat pan mounted to the support base and selectively movable in an outboard direction and an inboard direction relative to the support base, wherein the outboard direction and the inboard direction are transverse to the travel path defined by the track; and a seat mounted on the seat pan such that the seat pan is between the seat and the support base, wherein the seat includes a seat bottom section and a seat back section, and wherein the seat back section is selectively reclinable relative to the seat bottom section to transition the pilot seat assembly between a control position and a rest position.

Clause 2. The pilot seat assembly of Clause 1, further comprising:

an adjustment mechanism configured to one of (i) move the support base toward the aft end of the track or (ii) release the support base to enable the support base to be moved toward the aft end of the track to transition from the control position to the rest position;

wherein the adjustment mechanism is further configured to one of (iii) move the support base toward the forward end of the track or (iv) release the support base to enable the support base to be moved toward the forward end of the track to transition from the rest position to the control position.

Clause 3. The pilot seat assembly of Clause 1 or Clause 2, further comprising a first input device actuatable to concurrently enable both the seat back section to recline and the support base to slide toward the aft end of the track to transition from the control position to the rest position.

Clause 4. The pilot seat assembly of any of Clauses 1-3, wherein the seat back section in the rest position is oriented at least 40 degrees relative to an upward vertical direction.

Clause 5. The pilot seat assembly of any of Clauses 1-4, wherein the support base is selectively movable at least 15 inches along the travel path between the forward end and the aft end of the track.

Clause 6. The pilot seat assembly of any of Clauses 1-5, wherein the track is a straight track, and wherein the travel path is a linear travel path.

Clause 7. The pilot seat assembly of Clause 6, wherein the linear travel path is oriented parallel to a longitudinal axis of the vehicle.

Clause 8. The pilot seat assembly of Clause 6, wherein the support base is restricted to movement along the linear travel path.

Clause 9. The pilot seat assembly of any of Clauses 1-8, wherein the vehicle is an aircraft, and the track is mounted on the floor within a flight deck of the aircraft.

Clause 10. The pilot seat assembly of any of Clauses 1-9, wherein the track includes multiple parallel channels, and wherein each of the parallel channels receives a corresponding bracket of the support base therein.

Clause 11. The pilot seat assembly of any of Clauses 1-10, further comprising a lower leg support structure selectively movable from a stowed position while the seat is in the control position to a deployed position while the seat is in the rest position.

Clause 12. The pilot seat assembly of any of Clauses 1-11, wherein the seat in the rest position qualifies as a Class III crew rest facility according to Federal Aviation Administration (FAA) guidelines.

Clause 13. An aircraft comprising:

a pilot seat assembly within a flight deck of the aircraft, wherein the pilot seat assembly comprises:

a track mounted on a floor of the flight deck and defining a linear travel path from a forward end of the track to an aft end of the track, wherein the linear travel path is oriented parallel to a longitudinal axis of a fuselage of the aircraft;

a support base coupled to the track and selectively moveable along the linear travel path;

a seat pan mounted to the support base and selectively movable in an outboard direction and an inboard direction relative to the support base, wherein the outboard direction and the inboard direction are transverse to the linear travel path defined by the track; and a seat mounted on the seat pan such that the seat pan is between the seat and the support base, wherein the seat includes a seat bottom section and a seat back section;

wherein the pilot seat assembly is configured to transition from a control position, at which a pilot controls the aircraft, to a rest position by the seat back section reclining relative to the seat bottom section and the support base moving toward the aft end of the track.

Clause 14. The aircraft of Clause 13, wherein the seat back section in the rest position is oriented at least 40 degrees relative to an upward vertical direction.

Clause 15. The aircraft of Clause 13 or Clause 14, wherein the support base is selectively movable at least 15 inches along the linear travel path between the forward end and the aft end of the track.

Clause 16. The aircraft of any of Clauses 13-15, further comprising a first input device actuatable to concurrently cause both the seat back section to recline and the support base to slide toward the aft end of the track to transition from the control position to the rest position.

Clause 17. The aircraft of any of Clauses 13-16, wherein the support base is restricted to movement along the linear travel path.

Clause 18. A method of assembling a pilot seat assembly, the method comprising:

mounting a track on a floor of a vehicle, wherein the track defines a travel path from a forward end of the track to an aft end of the track;

coupling a support base to the track such that the support base is selectively moveable along the travel path;

mounting a seat pan to the support base such that the seat pan is selectively movable in an outboard direction and an inboard direction relative to the support base, wherein the outboard direction and the inboard direction are transverse to the travel path defined by the track; and mounting a seat on the seat pan such that the seat pan is between the seat and the support base, wherein the seat includes a seat bottom section and a seat back section, and wherein the seat back section is selectively reclinable relative to the seat bottom section to transition the pilot seat assembly between a control position and a rest position.

Clause 19. The method of Clause 18, wherein said mounting the track on the floor of the vehicle comprises mounting the track within a flight deck of an aircraft, and wherein the seat is configured to be occupied by a pilot of the aircraft.

Clause 20. The method of Clause 18 or Clause 19, wherein the travel path defined by the track is a linear travel path, wherein the support base is coupled to the track such that the support base is slidable along the linear travel path at least 15 inches toward the aft end of the track to transition the pilot seat assembly from the control position to the rest position, and wherein the support base is restricted to movement along the linear travel path.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A pilot seat assembly comprising:
   a track mounted on a floor within a flight deck of an aircraft and defining a travel path from a forward end of the track to an aft end of the track, wherein the track is oriented so the aft end of the track is located between the forward end of the track and a tail section of the aircraft;
   a support base coupled to the track and selectively moveable along the travel path;
   a seat pan mounted to the support base and selectively movable in an outboard direction and an inboard direction relative to the support base, wherein the outboard direction and the inboard direction are transverse to the travel path defined by the track;
   a seat mounted on the seat pan such that the seat pan is between the seat and the support base, wherein the seat includes a seat bottom section and a seat back section, and wherein the seat back section is selectively reclinable relative to the seat bottom section; and
   an adjustment mechanism including a control device and one or more actuators, wherein, in response to receiving a first user input signal while the pilot seat assembly is in a control position, the control device transitions the pilot seat assembly from the control position to a rest position by controlling the one or more actuators to both (i) move the support base at least 15 inches toward the aft end of the track and (ii) recline the seat back section of the seat relative to the seat bottom section.

2. The pilot seat assembly of claim 1, wherein, in response to receiving a second user input signal while the pilot seat assembly is in the rest position, the control device transitions the pilot seat assembly to the control position by controlling the one or more actuators to both (iii) move the support base toward the forward end of the track and (iv) lift the seat back section of the seat relative to the seat bottom section to attain a more upright orientation of the seat than in the rest position.

3. The pilot seat assembly of claim 1, further comprising an input device communicatively connected to the control device and actuatable to communicate the first user input signal to the control device.

4. The pilot seat assembly of claim 1, wherein the seat back section in the rest position is oriented at least 40 degrees relative to an upward vertical direction.

5. The pilot seat assembly of claim 1, wherein the control device is configured to control the one or more actuators to move the support base at least 20 inches towards the aft end of the track during the transition from the control position to the rest position.

6. The pilot seat assembly of claim 1, wherein the track is a straight track, and wherein the travel path is a linear travel path.

7. The pilot seat assembly of claim 6, wherein the linear travel path is oriented parallel to a longitudinal axis of the aircraft.

8. The pilot seat assembly of claim 6, wherein the support base is restricted to movement along the linear travel path.

9. The pilot seat assembly of claim 1, wherein the track includes multiple parallel channels, and the support base includes multiple brackets that extend into different corresponding channels of the parallel channels of the track, wherein the brackets slide within the parallel channels as the support base is moved along the linear travel path.

10. The pilot seat assembly of claim 1, further comprising a lower leg support structure selectively movable from a stowed position while the seat is in the control position to a deployed position while the seat is in the rest position.

11. An aircraft comprising:
   a pilot seat assembly within a flight deck of the aircraft, wherein the pilot seat assembly comprises:
      a track mounted on a floor of the flight deck and defining a linear travel path from a forward end of the track to an aft end of the track, wherein the linear travel path is oriented parallel to a longitudinal axis of a fuselage of the aircraft;
a support base coupled to the track and selectively moveable along the linear travel path;
a seat pan mounted to the support base and selectively movable in an outboard direction and an inboard direction relative to the support base, wherein the outboard direction and the inboard direction are transverse to the linear travel path defined by the track;
a seat mounted on the seat pan such that the seat pan is between the seat and the support base, wherein the seat includes a seat bottom section and a seat back section; and
an input device, wherein, in response to being actuated by a user, the input device triggers actuators to both (i) recline the seat back section relative to the seat bottom section and (ii) slide the support base at least 15 inches toward the aft end of the track to transition the pilot seat assembly from a control position to a rest position.

12. The aircraft of claim 11, wherein the seat back section in the rest position is oriented at least 40 degrees relative to an upward vertical direction.

13. The aircraft of claim 11, wherein the input device triggers the actuators to slide the support base at least 20 inches along the linear travel path toward the aft end of the track during the transition to the rest position.

14. The aircraft of claim 11, wherein the support base is restricted to movement along the linear travel path.

15. The pilot seat assembly of claim 1, wherein the control device controls the one or more actuators to concurrently (i) move the support base towards the aft end of the track and (ii) recline the seat back section of the seat, to transition the pilot seat assembly to the rest position.

16. The pilot seat assembly of claim 1, wherein the control device controls the one or more actuators to sequentially (i) move the support base towards the aft end of the track and (ii) recline the seat back section of the seat, to transition the pilot seat assembly to the rest position.

17. The aircraft of claim 11, further comprising a control device communicatively connected to the input device,
wherein, in response to receiving a user input signal generated by the input device while the pilot seat assembly is in the control position, the control device controls the actuators to both (i) move the support base toward the aft end of the track and (ii) recline the seat back section of the seat relative to the seat bottom section.

18. A pilot seat assembly comprising:
a track mounted on a floor of a flight deck of an aircraft and defining a travel path from a forward end of the track to an aft end of the track;
a support base coupled to the track and selectively moveable along the travel path;
a seat pan mounted to the support base;
a seat mounted on the seat pan, the seat including a seat bottom section and a seat back section, the seat back section selectively reclinable relative to the seat bottom section;
a first locking mechanism that secures the support base in a fixed position relative to the track;
a second locking mechanism that secures the seat back section of the seat in a fixed position relative to the seat bottom section; and
an input device that is selectively actuatable by a user on the seat to release both the first locking mechanism and the second locking mechanism to enable the pilot seat assembly to transition from a control position to a rest position by enabling the user to slide the support base toward the aft end of the track and recline the seat back section relative to the seat bottom section.

19. The pilot seat assembly of claim 18, wherein the input device is a lever.

20. The aircraft of claim 11, wherein the track includes multiple parallel channels, and the support base includes multiple brackets that extend into different corresponding channels of the parallel channels of the track, wherein the brackets slide within the parallel channels as the support base is moved along the linear travel path.

* * * * *